US012665331B2

(12) United States Patent
Phatiwuttipat

(10) Patent No.: US 12,665,331 B2
(45) Date of Patent: Jun. 23, 2026

(54) FLEXIBLE CABLE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Pipatthana Phatiwuttipat, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 298 days.

(21) Appl. No.: 18/290,431

(22) PCT Filed: Mar. 23, 2022

(86) PCT No.: PCT/JP2022/013443

§ 371 (c)(1),
(2) Date: Nov. 13, 2023

(87) PCT Pub. No.: WO2022/249688

PCT Pub. Date: Dec. 1, 2022

(65) Prior Publication Data

US 2024/0258729 A1 Aug. 1, 2024

(30) Foreign Application Priority Data

May 26, 2021 (JP) ................................ 2021-088198

(51) Int. Cl.
*H01R 12/77* (2011.01)
*H01R 13/516* (2006.01)

(52) U.S. Cl.
CPC ......... *H01R 12/771* (2013.01); *H01R 13/516* (2013.01)

(58) Field of Classification Search
CPC ... H01R 13/516; H01R 13/627; H01R 12/771
See application file for complete search history.

(56) References Cited

U.S. PATENT DOCUMENTS 4,323,295 A * 4/1982 Davis, Jr. ............. H01R 12/775 439/465
2015/0079823 A1* 3/2015 Lindblom .......... H01R 13/5825 439/110
2021/0098931 A1 4/2021 Phatiwuttipat et al.

FOREIGN PATENT DOCUMENTS

JP H04-043863 U1 4/1992
JP 2000-243493 A 9/2000
JP 2009-158170 A 7/2009

OTHER PUBLICATIONS

International Search Report issued on May 24, 2022 for WO 2022/249688 A1 (4 pages).

* cited by examiner

*Primary Examiner* — Sean Gugger
(74) *Attorney, Agent, or Firm* — Venjuris, P.C.

(57) ABSTRACT

It is aimed to simplify the shapes of housings. A flexible cable connector is provided with a first housing (27), a second housing (46) to be stacked on the first housing (27), a first flexible cable (40) to be connected to a first terminal fitting (39) mounted in the first housing (27), a second flexible cable (57) to be connected to a second terminal fitting (56) mounted in the second housing (46), first boss pins (37) formed on the first housing (27) for positioning the second housing (46) and the second flexible cable (57) by being passed through the second housing (46) and the second flexible cable (57), and second boss pins (54) formed (Continued)

on the second housing (46) for positioning the first housing (27) and the first flexible cable (40) by being passed through the first housing (27) and the first flexible cable (40).

7 Claims, 9 Drawing Sheets

FLEXIBLE CABLE CONNECTOR

CROSS REFERENCE TO RELATED APPLICATIONS

This application is a national phase of PCT application No. PCT/JP2022/013443, filed on 23 Mar. 2022, which claims priority from Japanese patent application No. 2021-088198, filed on 26 May 2021, all of which are incorporated herein by reference.

TECHNICAL FIELD

The present disclosure relates to a flexible cable connector.

BACKGROUND

Patent Document 1 discloses a connector structured by attaching a flat cable to a housing. A plurality of terminal fittings arranged on an end part of the flat cable are accommodated in the housing. A position shift of the flat cable with respect to the housing is prevented by fitting reinforcement holes formed in the flat cable to bosses formed on the housing.

PRIOR ART DOCUMENT

Patent Document

Patent Document 1: Republication of WO 2019/188738

SUMMARY OF THE INVENTION

Problems to be Solved

In the connector of Patent Document 1, one flat cable is attached to one housing. In the case of increasing the number of poles, it is thought to assemble a plurality of housings and a plurality of flat cables in a stacked state. In this case, each housing needs to be formed with positioning portions to position the housings stacked on each other. Thus, there is a problem that the shapes of the housings become complicated.

A flexible cable connector of the present disclosure was completed on the basis of the above situation and aims to simplify the shapes of housings.

Means to Solve the Problem

The present disclosure is directed to a flexible cable connector with a first housing, a second housing to be stacked on the first housing, a first flexible cable to be connected to a first terminal fitting mounted in the first housing, a second flexible cable to be connected to a second terminal fitting mounted in the second housing, first boss pins formed on the first housing, the first boss pins positioning the second housing and the second flexible cable by being passed through the second housing and the second flexible cable, and second boss pins formed on the second housing, the second boss pins positioning the first housing and the first flexible cable by being passed through the first housing and the first flexible cable.

Effect of the Invention

According to the present disclosure, it is possible to simplify the shapes of a first housing and a second housing.

DETAILED DESCRIPTION TO EXECUTE THE INVENTION

Description of Embodiments of Present Disclosure

Figure 1:
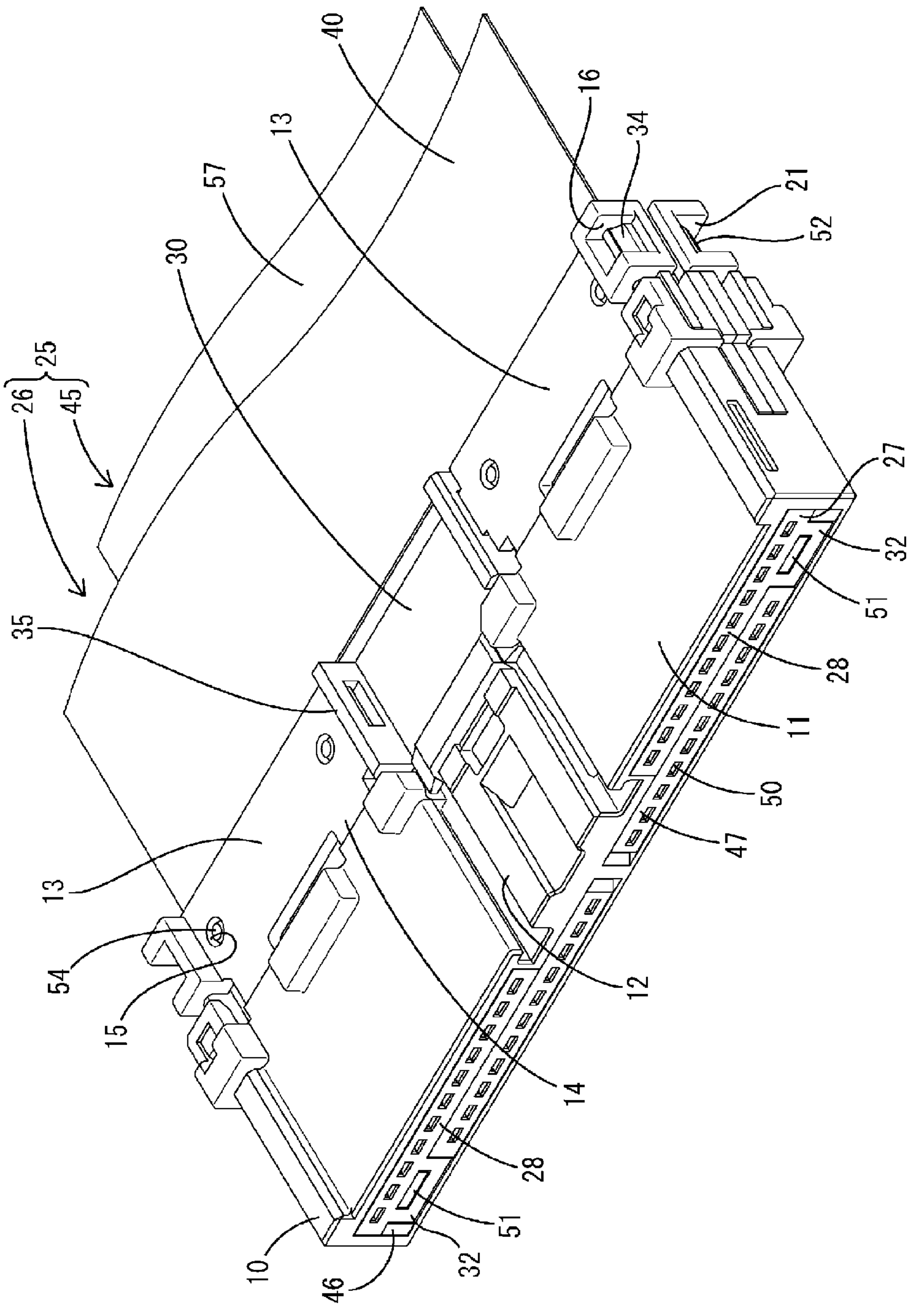
FIG. 1 is a perspective view of a flexible cable connector of one embodiment when viewed obliquely from above.

First, embodiments of the present disclosure are listed and described.

(1) The flexible cable connector of the present disclosure is provided with a first housing, a second housing to be stacked on the first housing, a first flexible cable to be connected to a first terminal fitting mounted in the first housing, a second flexible cable to be connected to a second terminal fitting mounted in the second housing, first boss pins formed on the first housing, the first boss pins positioning the second housing and the second flexible cable by being passed through the second housing and the second flexible cable, and second boss pins formed on the second housing, the second boss pins positioning the first housing and the first flexible cable by being passed through the first housing and the first flexible cable. According to the configuration of the present disclosure, the first boss pins have both a function of positioning the second housing and the second flexible cable and a function of positioning the first and second housings. The second boss pins have both a function of positioning the first housing and the first flexible cable and the function of positioning the first and second housings. Since one boss pin has two positioning functions, the shapes of the first and second housings can be simplified.

(2) Preferably, the first flexible cable is arranged along a surface of the first housing on a side opposite to the first boss pins, and the second flexible cable is arranged along a surface of the second housing on a side opposite to the second boss pins. According to this configuration, the first flexible cable needs not be formed with holes, through which the first boss pins are passed. The second flexible cable needs not be formed with holes, through which the second boss pins are passed.

(3) Preferably, the first flexible cable includes a first connecting end portion to be connected to the first terminal fitting, the second flexible cable includes a second connecting end portion to be connected to the second terminal fitting, the second boss pins are passed through the first connecting end portion, the first boss pins are passed through the second connecting end portion, and at least a part of the first connecting end portion and at least a part of the second connecting end portion are arranged in mutually different regions in a width direction orthogonal to a stacking direction of the first and second housings. According to this configuration, margins can be provided for intervals of the first and second boss pins in the width direction.

(4) Preferably, in (3), an outer housing is provided which accommodates the first and second housings in a stacked state, a lock arm is formed in a central part in the width direction of the outer housing, the first housing is formed with a cut portion for avoiding interference with the lock arm, and a pair of the first connecting end portions are arranged across the lock arm in the width direction. According to this configuration, load concentration on some first boss pins can be prevented when a tensile force acts on the first flexible cable.

(5) Preferably, an outer housing is provided which accommodate the first and second housings in a stacked state, and window holes for exposing the first and second boss pins are formed in an outer surface of the outer housing. According to this configuration, a positional relationship of the first and second housings with respect to the outer housing can be visually confirmed.

(6) Preferably, in (5), the outer housing is formed with a holding portion swingable in a stacking direction of the first and second housings, the holding portion holding the first and second flexible cables in a sandwiched state, the holding portion is formed with the window holes, and the first and second boss pins are fit in the window holes with the first and second flexible cables sandwiched by the holding portion. According to this configuration, when the first and second housings are assembled in an improper state with the outer housing, the holding portion interferes with the first and second boss pins. In this way, it can be judged whether or not the first and second housings are accommodated in a proper state into the outer housing.

(7) Preferably, in (5) or (6), the first and second housings include locking portions for holding the first and second housings in the stacked state. According to this configuration, since the first and second housings can be integrated before being assembled with the outer housing, workability is good.

DETAILS OF EMBODIMENT OF PRESENT DISCLOSURE

Embodiment

Figure 7:
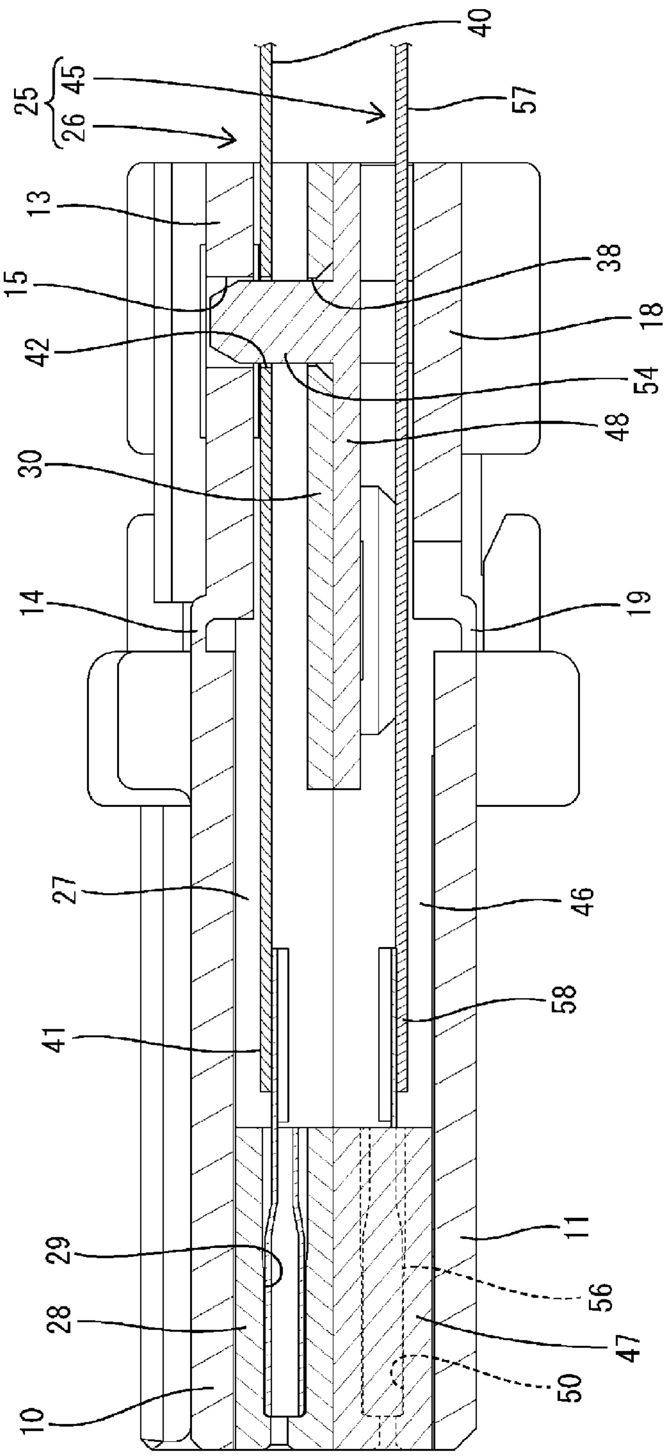
FIG. 7 is a side view in section showing a positioning structure by a second boss pin.
Figure 8:
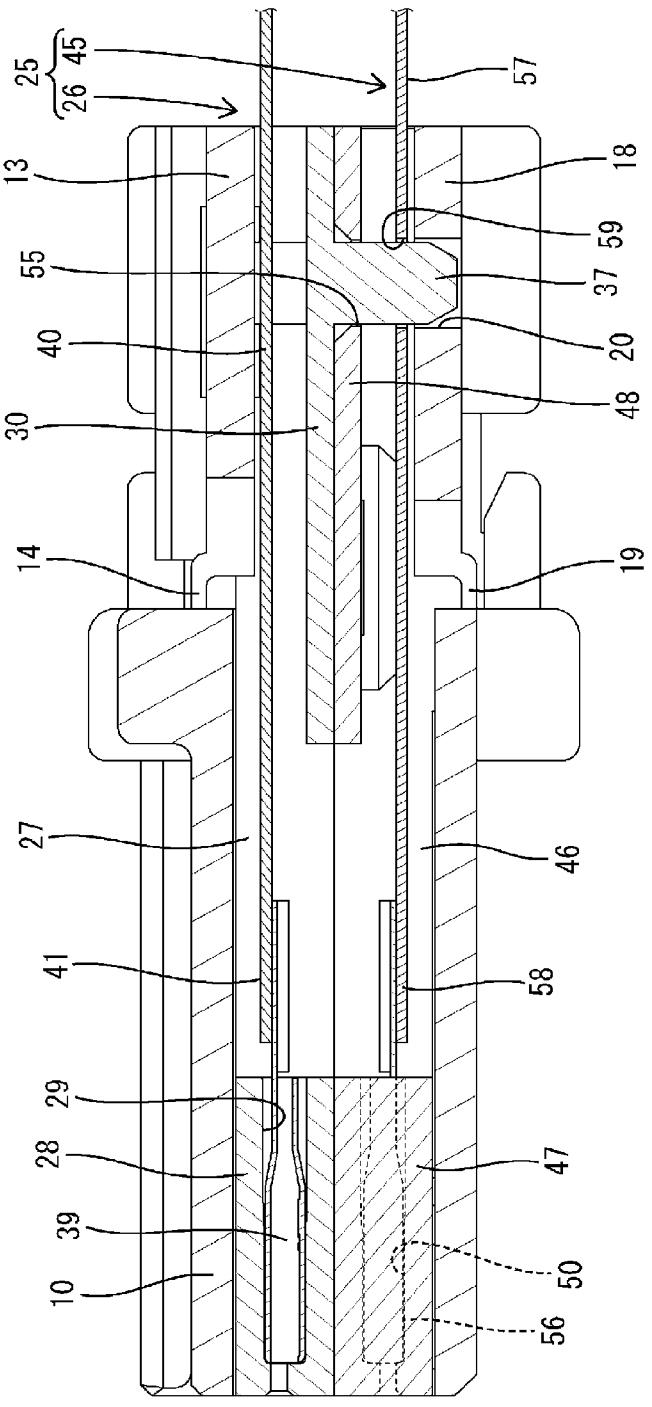
FIG. 8 is a side view in section showing a positioning structure by a first boss pin.
Figure 9:
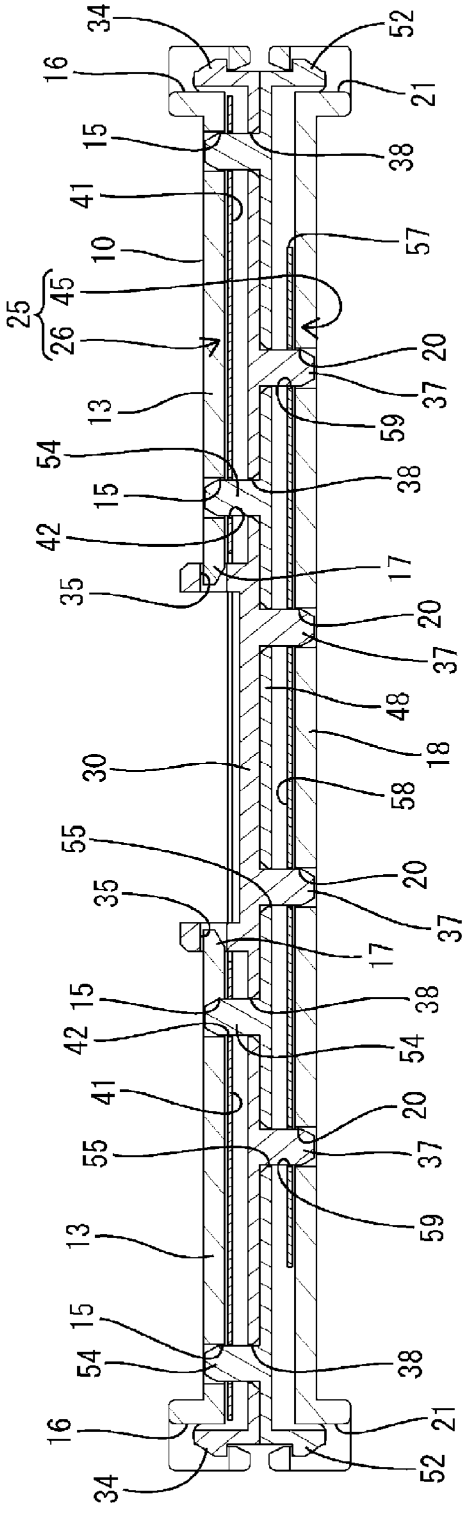
FIG. 9 is a front view in section showing the arrangement of the first and second boss pins.

One specific embodiment of a flexible cable connector of the present disclosure is described below with reference to FIGS. 1 to 9. Note that the present invention is not limited to these illustrations, but is represented by claims and intended to include all changes in the scope of claims and in the meaning and scope of equivalents. In this embodiment, an oblique left-lower side in FIGS. 1 to 3 and 5, an oblique left-upper side in FIGS. 4 and 6 and a left side in FIGS. 7 and 8 are defined as a front side concerning a front-rear direction. Upper and lower sides shown in FIGS. 1 to 9 are directly defined as upper and lower sides concerning a vertical direction. The vertical direction and a height direction are used as synonyms. A lateral direction and a width direction are used as synonyms.

Figure 2:
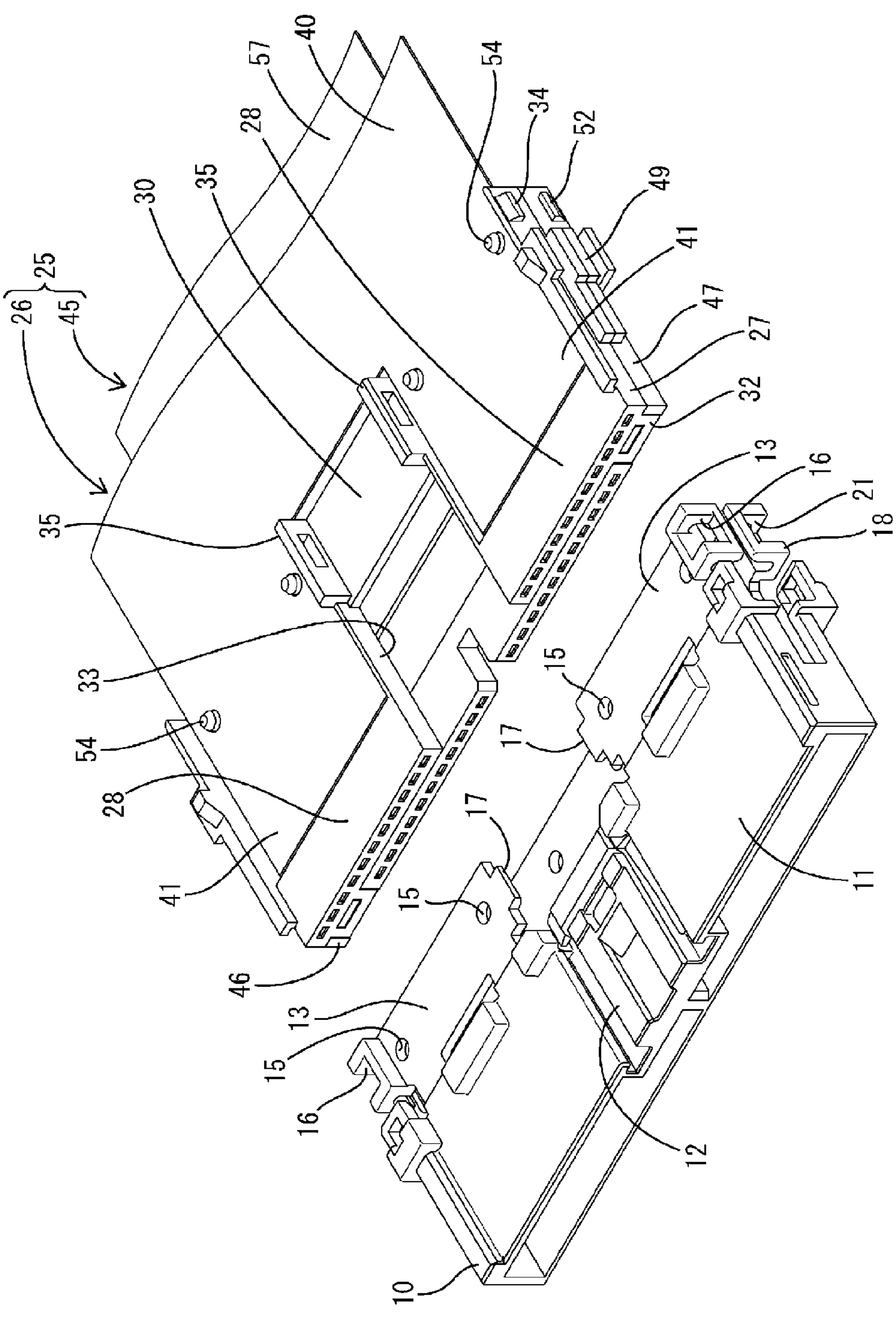
FIG. 2 is a perspective view showing a state where an outer housing and an inner module are separated when viewed obliquely from above.
Figure 3:
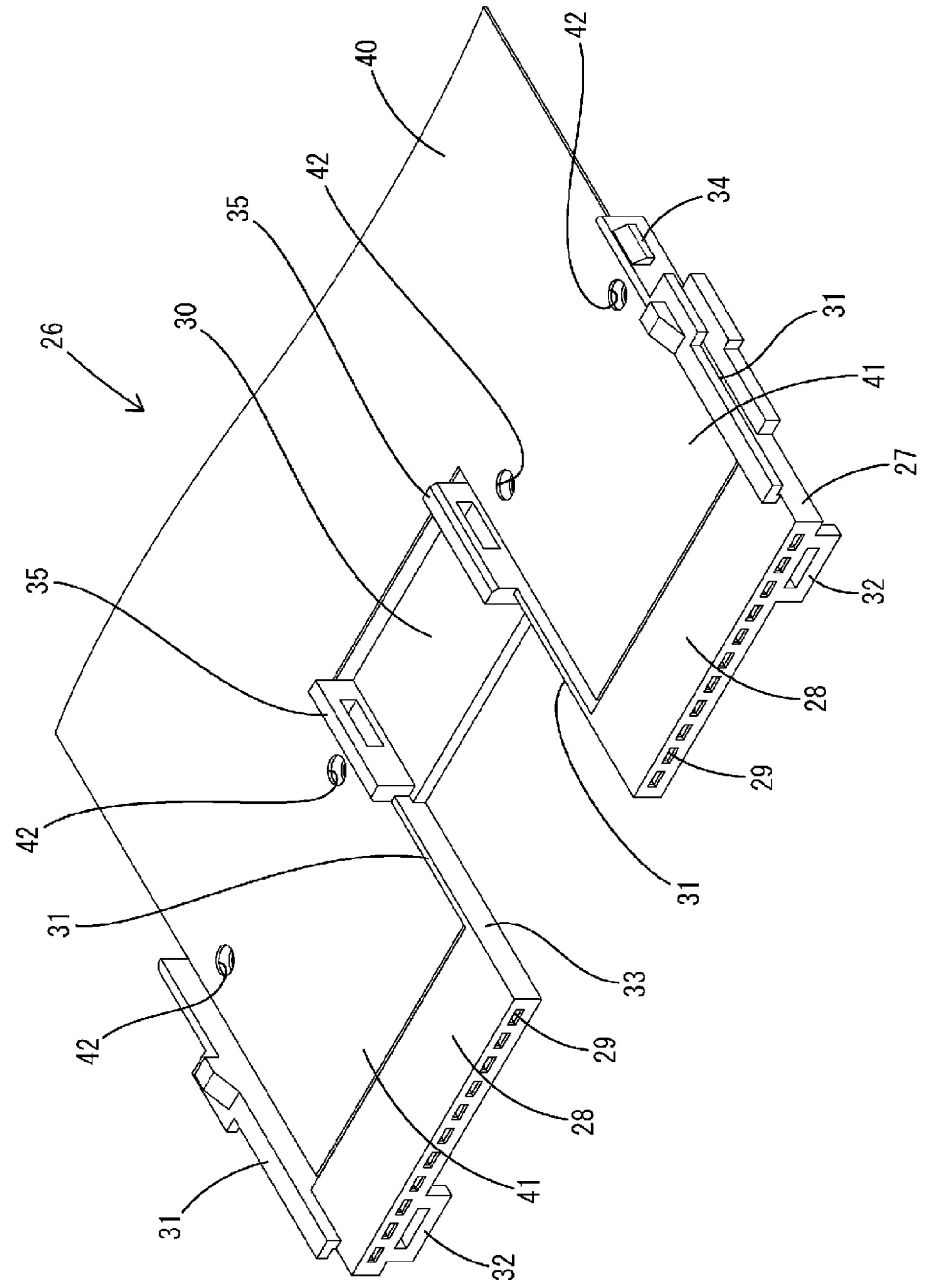
FIG. 3 is a perspective view of a first module when viewed obliquely from above.
Figure 4:
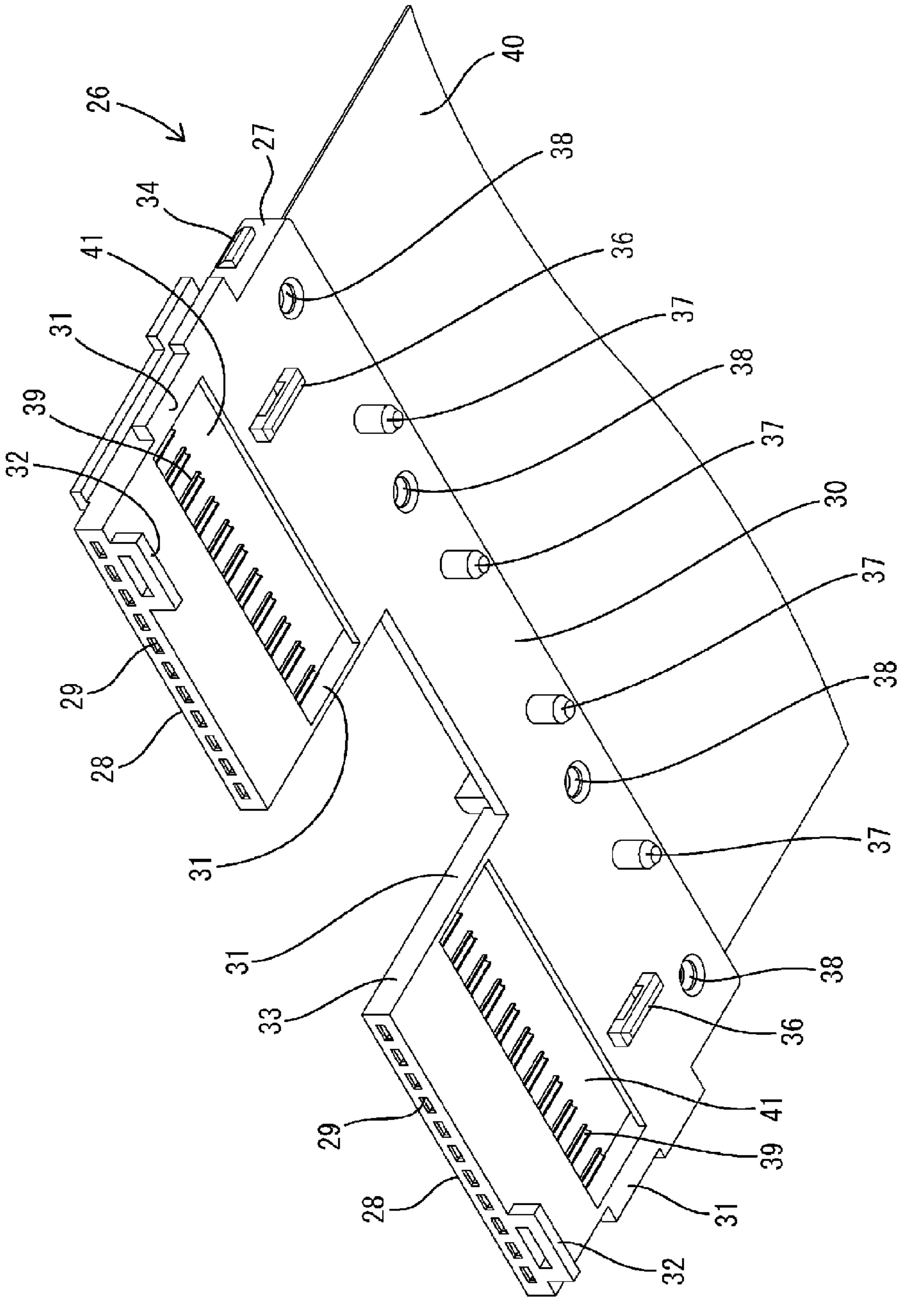
FIG. 4 is a perspective view of the first module when viewed obliquely from below.
Figure 5:
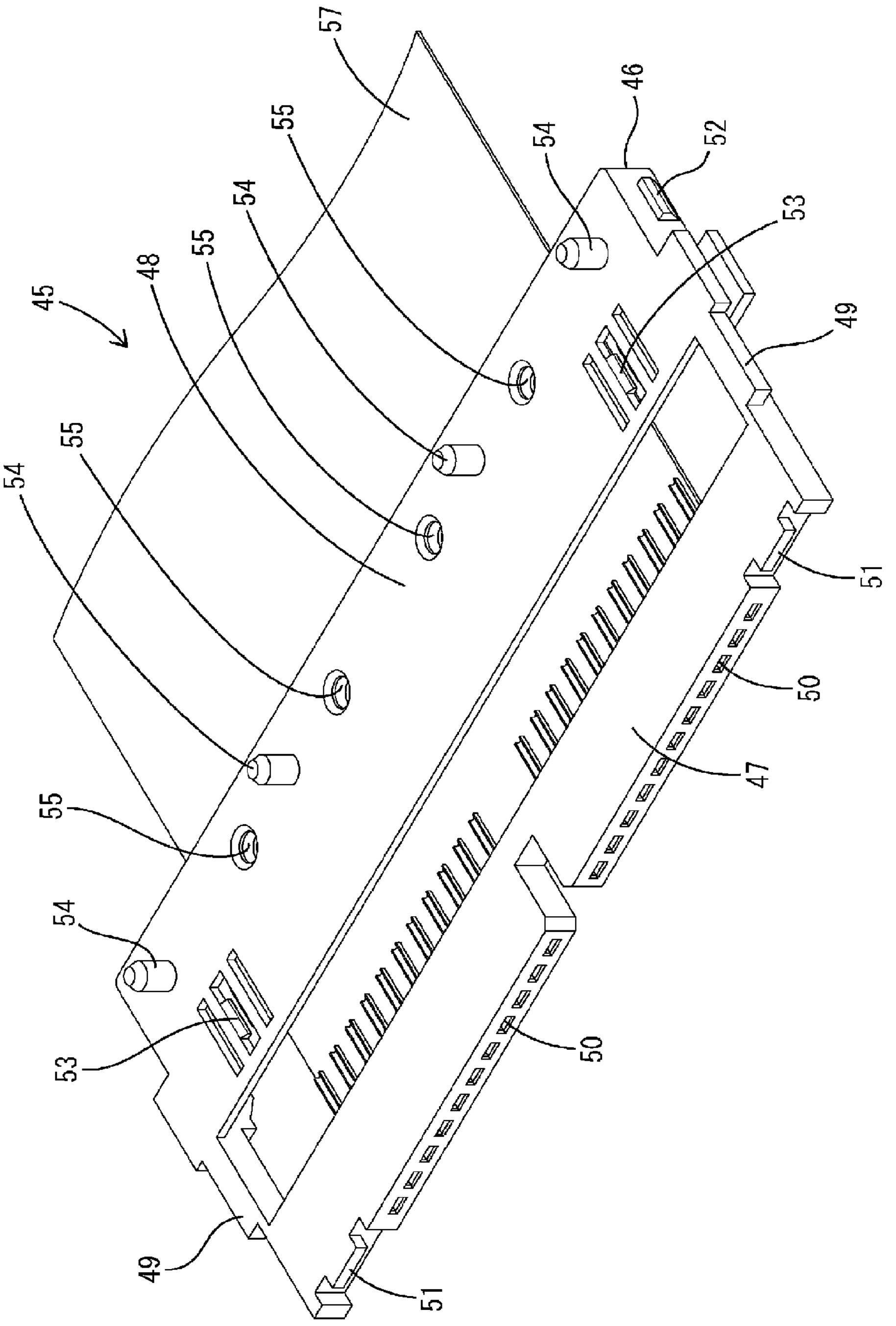
FIG. 5 is a perspective view of a second module when viewed obliquely from above.
Figure 6:
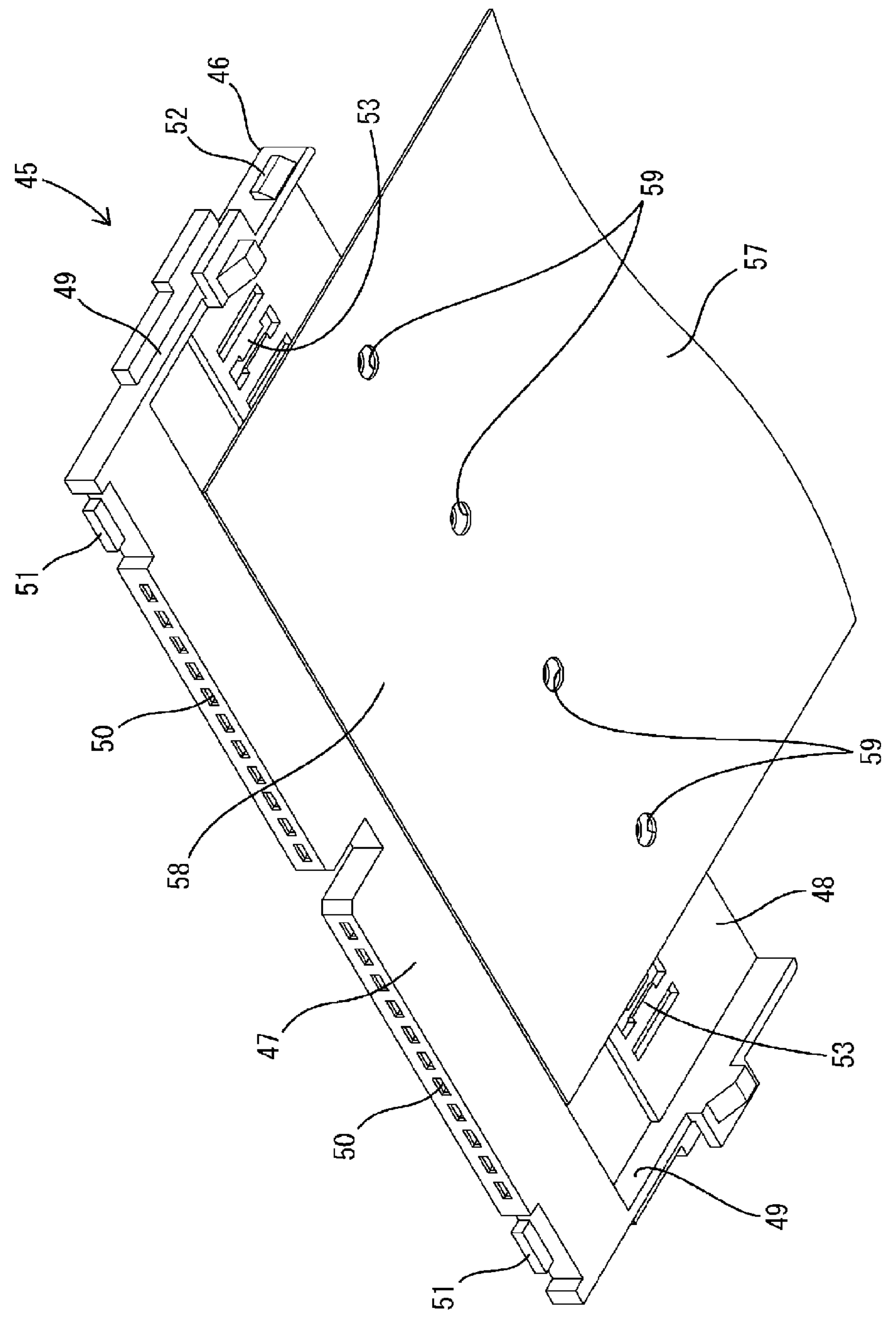
FIG. 6 is a perspective view of the second module when viewed obliquely from below.

A flexible cable connector of this embodiment is configured by assembling one outer housing 10 and one inner module 25. As shown in FIGS. 1 and 2, the outer housing 10 has a flat rectangular parallelepiped shape having a length in the front-rear direction larger than a height in the vertical direction and having a width in the lateral direction larger than the length. The outer housing 10 is a single component including a housing body portion 11 in the form of a rectangular tube hollow in the front-rear direction, a lock arm 12, a pair of first holding portions 13 and one second holding portion 18. The lock arm 12 is a part for holding the outer housing 10 and an unillustrated mating housing in a connected state. The lock arm 12 is arranged in a widthwise central part of an upper wall part, out of the upper wall part and a lower wall part constituting a housing body.

The pair of first holding portions 13 are plate-like parts arranged across the lock arm 12 in the width direction. The pair of first holding portions 13 extend rearward via first hinge portions 14 from the rear end edge of the upper wall part. The first holding portion 13 can swing upward, i.e. toward an outer surface side of the outer housings 10, with the first hinge portion 14 as a fulcrum. Each first holding portion 13 is formed with a pair of first window holes 15 spaced apart in the width direction. The first window hole 15 penetrates through the first holding portion 13 in the vertical direction, i.e. in a plate thickness direction of the first holding portion 13. A first holding hole 16 is formed on an end part on an outer side surface side of the outer housing 10, out of both widthwise end parts of the first holding portion 13. A holding projection 17 is formed on the end part on the side of the lock arm 12, out of the both widthwise end parts of the first holding portion 13.

The second holding portion 18 is arranged over an entire width region of the outer housing 10. The second holding portion 18 is plate-like and extends rearward via a second hinge portion 19 from the rear end edge of the lower wall part. The second holding portion 18 can swing downward, i.e. toward an outer surface side of the outer housings 10, with the second hinge portion 19 as a fulcrum. The second holding portion 18 is formed with four second window holes 20. The second window hole 20 penetrates through the second holding portion 18 in the vertical direction, i.e. in a plate thickness direction of the second holding portion 18. The second window holes 20 are arranged at the same position as the first window holes 15 in the front-rear direction and arranged at positions different from the first window holes 15 in the width direction. Second holding holes 21 are formed on both widthwise end parts of the second holding portion 18.

The inner module 25 is configured by assembling a first module 26 and a second module 45 into a state stacked in the vertical direction. The first module 26 is configured by assembling one first housing 27, a plurality of first terminal fittings 39 and one first flexible cable 40.

The first housing 27 has a flat shape having a length in the front-rear direction larger than a height in the vertical direction and having a width in the lateral direction larger than the length. The first housing 27 is a single component including a pair of left and right first terminal accommodating portions 28, a first base plate portion 30 arranged behind the first terminal accommodating portions 28 and elongated in the width direction and two pairs of first linking portions 31. A plurality of first terminal accommodation chambers 29 arranged in the width direction are formed in the first terminal accommodating portion 28. A first front locking portion 32 is formed on a front end part of the first terminal accommodating portion 28. The two pairs of first linking portions 31 link both widthwise end parts of rear end parts of the first terminal accommodating portions 28 and the front end edge of the first base plate portion 30. A cut portion 33 is formed in a region of the first housing 27 forward of the first base plate portion 30 and sandwiched by the pair of first terminal accommodating portions 28. The cut portion 33 is a space for avoiding interference with the lock arm 12, and is open in both upper and lower surfaces and front surface of the first housing 27.

A pair of first holding projections 34 projecting from the outer side surfaces of the first base plate portion 30 are formed on both widthwise end parts of the first base plate portion 30. A pair of holding hole portions 35 behind and adjacent to both left and right side edges of the cut portion 33 are formed on the upper surface of the first base plate portion 30. A pair of left and right first rear locking portions 36 are formed on the lower surface of the first base plate portion 30. The first rear locking portions 36 are arranged in formation regions of the first terminal accommodating portions 28 in the width direction.

Four first boss pins 37 projecting downward are formed on the lower surface of the first base plate portion 30. The four first boss pins 37 are arranged in a row in the width direction while being spaced apart in the width direction. Two first boss pins 37 located in a center, out of the four first boss pins 37, are arranged in a formation region of the cut portion 33 in the width direction. Two first boss pins 37 on both widthwise end sides are arranged in the formation regions of the first terminal accommodating portions 28 in the width direction.

The first base plate portion 30 is formed with four first fitting holes 38 penetrating through the first base plate portion 30 in the vertical direction, i.e. in a plate thickness direction. The four first fitting holes 38 are arranged in a row in the width direction while being spaced apart in the width direction. The first fitting holes 38 are arranged at the same positions as the first boss pins 37 in the front-rear direction. The four first fitting holes 38 are arranged in the formation regions of the first terminal accommodating portions 28 in the width direction. Two first fitting holes 38 on a right side are arranged across one first boss pin 27 in the width direction. Two first fitting holes 38 on a left side are also arranged across one first boss pin 27 in the width direction.

The first flexible cable 40 is a known one, in which conductive paths and circuits are formed on a base film, which is a flexible insulator in the form of a thin film. Specific examples of the first flexible cable include flexible printed circuit boards and flexible flat cables.

A pair of left and right first connecting end portions 41 are formed on a front end part of the first flexible cable 40. Formation regions of the pair of first connecting end portions 41 in the width direction are only regions from both widthwise ends of the first housing 27 to the cut portion 33, in other words, regions obtained by excluding the cut portion 33 from an entire width range of the first housing 27. Formation ranges of the pair of first connecting end portions 41 in the width direction are the same regions as the formation ranges of the pair of first terminal accommodating portions 28 in the width direction. The plurality of first terminal fittings 39 arranged in parallel at predetermined intervals in the width direction are electrically conductively welded to front end parts of the first connecting end portions 41 by a reflow process. The plurality of first terminal fittings 39 are individually inserted into the plurality of first terminal accommodation chambers 29 from behind the first terminal accommodating portions 28.

The first flexible cable 40 is formed with four first through holes 42 penetrating through the first flexible cable 40 in a thickness direction. The four first through holes 42 are arranged in a row in the width direction while being spaced apart in the width direction. The first through holes 42 are arranged in the first connecting end portions 41, and two first through holes 42 are arranged in each first connecting end portion 41. The four first through holes 42 are arranged at the same positions as the four first fitting holes 38.

The second module 45 is configured by assembling one second housing 46, a plurality of second terminal fittings 56 and one second flexible cable 57. The second housing 46 has a flat shape having a length in the front-rear direction larger than a height in the vertical direction and having a width in the lateral direction larger than the length. The length in the front-rear direction of the second housing 46 is equal to that of the first housing 27. The width of the second housing 46 is equal to that of the first housing 27.

The second housing 46 is a single component including a second terminal accommodating portion 47 elongated in the width direction, a second base plate portion 48 arranged behind the second terminal accommodating portion 47 and elongated in the width direction, and a pair of second linking portions 49. A plurality of second terminal accommodation chambers 50 arranged in the width direction are formed in the second terminal accommodating portion 47. A pair of projection-like second front locking portions 51 are formed on both widthwise end parts of the front end surface of the second terminal accommodating portion 47. The pair of second linking portions 49 link both widthwise end parts of a rear end part of the second terminal accommodating portion 47 and both widthwise end parts of the front end edge of the second base plate portion 48.

A pair of second holding projections 52 projecting from the outer side surfaces of the second base plate portion 48 are formed on both widthwise end parts of the second base plate portion 48. A pair of left and right second rear locking portions 53 are formed on the second base plate portion 48. The second rear locking portions 53 are arranged at the same positions as the first rear locking portions 36 in the width direction.

Four second boss pins 54 projecting upward are formed on the upper surface of the second base plate portion 48. The four second boss pins 54 are arranged in a row in the width direction while being spaced apart in the width direction. The four second boss pins 54 are arranged at positions to be fit into the four first fitting holes 38 and the four first through holes 42 when the first and second housings 27, 46 are stacked.

The second base plate portion 48 is formed with four second fitting holes 55 penetrating through the second base plate portion 48 in the vertical direction, i.e. in a plate thickness direction. The four second fitting holes 55 are arranged in a row in the width direction while being spaced apart in the width direction. The second fitting holes 55 are arranged at positions different from the first fitting holes 38 in the width direction. The second fitting holes 55 are arranged at the same positions as the first and second boss pins 37, 54 in the front-rear direction. The four second fitting holes 55 are arranged at positions to be fit to the four first boss pins 37 when the first and second housings 27, 46 are stacked.

Similarly to the first flexible cable 40, the second flexible cable 57 is a known one, in which conductive paths and circuits are formed on a base film, which is a flexible insulator in the form of a thin film. A second connecting end portion 58 is formed on a front end part of the second flexible cable 57. The plurality of second terminal fittings 56 arranged in parallel at predetermined intervals in the width direction are electrically conductively welded to a front end part of the second connecting end portion 58 by a reflow process. The plurality of second terminal fittings 56 are individually inserted into the plurality of second terminal accommodation chambers 50 from behind the second terminal accommodating portion 47.

A formation range of the second connecting end portion 58 in the width direction is a range narrower that an entire width region of the second housing 46, i.e. only a region closer to a center than both widthwise end parts of the second housing 46. In the width direction, the formation ranges of the first connecting end portions 41 and that of the second connecting end portion 58 are partially the same regions, but the first connecting end portions 41 and the second connecting end portion 58 are partially arranged in mutually different regions. In the width direction, only the second connecting end portion 58 is arranged in the formation region of the cut portion 33. Only the first connecting end portions 41 are arranged on the both widthwise end parts of the first and second housings 27, 46.

The second connecting end portion 58 of the second flexible cable 57 is formed with four second through holes 59 penetrating through the second flexible cable 57 in the thickness direction. The four second through holes 59 are arranged in a row in the width direction while being spaced apart in the width direction. The four second through holes 59 are arranged at the same positions as the four second fitting holes 55.

An assembling procedure of the flexible cable connector of this embodiment is described. On the side of the first module 26, the first flexible cable 40 is set in a jig (not shown) and positioned by fitting the first through holes 42 to positioning protrusions (not shown) of the jig. After the first terminal fittings 39 are accommodated into the first terminal accommodation chambers 29, the first housing 27 is put on the first flexible cable 40 with the first boss pins 37 oriented upward and the first fitting holes 38 are fit to the positioning protrusions of the jig. In this way, the first flexible cable 40 and the first housing 27 are positioned. In this state, the rear end parts of the first terminal fittings 39 and the first connecting end portions 41 are fixed by the reflow process. In the above way, the assembling of the first module 26 is completed, and the first housing 27, the first terminal fittings 39 and the first flexible cable 40 are integrated.

On the other hand, on the side of the second module 45, the second flexible cable 57 is set in a jig (not shown) and positioned by fitting the second through holes 59 to positioning protrusions (not shown) of the jig. After the second terminal fittings 56 are accommodated into the second terminal accommodation chambers 50, the second housing 46 is put on the second flexible cable 57 with the second boss pins 54 oriented upward and the second fitting holes 55 are fit to the positioning protrusions of the jig. In this way, the second flexible cable 57 and the second housing 46 are positioned. In this state, the rear end parts of the second terminal fittings 56 and the second connecting end portion 58 are fixed by the reflow process. In the above way, the assembling of the second module 45 is completed and the second housing 46, the second terminal fittings 56 and the second flexible cable 57 are integrated.

Thereafter, the first housing 27 having the first boss pins 37 oriented to project downward is placed on and assembled with the upper surface of the second housing 46 having the second boss pins 54 oriented to project upward. With the both housings 27, 46 stacked and assembled, the first boss pins 37 are fit through the second fitting holes 55 and the second through holes 59. Projecting end parts of the first boss pins 37 project downward from the lower surface of the second flexible cable 57. The second boss pins 54 are fit through the first fitting holes 38 and the first through holes 42 and projecting end parts of the second boss pins 54 project upward from the upper surface of the first flexible cable 40. The both housings 27, 46 are held in a vertically stacked state by the locking action of the first front locking portions 32 and the second front locking portions 51 and the locking action of the first rear locking portions 36 and the second rear locking portions 53. That is, the first and second modules 26, 45 are held in a stacked state and the assembling of the inner module 25 is completed.

With the first and second modules 26, 45 stacked, the first fitting holes 38 of the first housing 27 and the first through holes 42 of the first flexible cable 40 are fit to the common second boss pins 54, whereby the first housing 27 and the first flexible cable 40 are positioned in the front-rear direction and width direction. The second fitting holes 55 of the second housing 46 and the second through holes 59 of the second flexible cable 57 are fit to the common first boss pins 37, whereby the second housing 46 and the second flexible cable 57 are positioned in the front-rear direction and width direction. The first and second housings 27, 46 are positioned in the front-rear direction and width direction by fitting the first boss pins 37 of the first housing 27 and the second fitting holes 55 of the second housing 46 and fitting the second boss pins 54 of the second housing 46 and the first fitting holes 38 of the first housing 27.

The completely assembled inner module 25 is inserted into the outer housing 10 from behind and assembled. In assembling the inner module 25, the first holding portions 13 and the second holding portion 18 are swung to be opened to an opening position by being displaced to the outer surface sides of the outer housing 10. After the inner module 25 is inserted into the outer housing 10, the first holding portions 13 are swung to a closing position to be placed on the upper surface of the first module 26, the first holding holes 16 are locked to the first holding projections 34 and the holding projections 17 are locked to the holding hole portions 35. By the locking action of these, the first holding portions 13 are unswingably locked. With the first holding portions 13 held at the closing position, the projecting end parts of the second boss pins 54 are fit in the first window holes 15.

After the inner module 25 is inserted into the outer housing 10, the second holding portion 18 is swung to a closing position to be placed on the lower surface of the second module 45, and the second holding holes 21 are locked to the second holding projections 52. By this locking action, the second holding portion 18 is unswingably locked. With the second holding portion 18 held at the closing position, the projecting end parts of the first boss pins 37 are fit in the second window holes 20. In the above way, the inner module 25 and the outer housing 10 are locked in the assembled state and the assembling of the flexible cable connector is completed.

The flexible cable connector of this embodiment is provided with the first housing 27, the second housing 46 stacked on the first housing 27, the first flexible cable 40 and the second flexible cable 57. The first flexible cable 40 is connected to the first terminal fittings 39 mounted in the first housing 27. The second flexible cable 57 is connected to the second terminal fittings 56 mounted in the second housing 46. The first housing 27 is formed with the first boss pins 37 for positioning the second housing 46 and the second flexible cable 57 by being passed through the second housing 46 and the second flexible cable 57. The second housing 46 is formed with the second boss pins 54 for positioning the first housing 27 and the first flexible cable 40 by being passed through the first housing 27 and the first flexible cable 40.

The first boss pins 37 have both a function of positioning the second housing 46 and the second flexible cable 47 and a function of positioning the first housing 27 and the second housing 46. The second boss pins 54 have both a function of positioning the first housing 27 and the first flexible cable 40 and the function of positioning the first housing 27 and the second housing 46. Since both the first boss pins 37 formed on the first housing 27 and the second boss pins 54 formed on the second housing 46 have two positioning function, the shapes of the first and second housings 27, 46 can be simplified.

The first flexible cable 40 is arranged along a surface of the first housing 27 on a side opposite to the first boss pins 37. The second flexible cable 57 is arranged along a surface of the second housing 46 on a side opposite to the second boss pins 54. According to this configuration, the first flexible cable 40 needs not be formed with holes, through which the first boss pins 37 are passed. The second flexible cable 57 needs not be formed with holes, through which the second boss pins 54 are passed. In this way, a reduction in the strength of the first and second flexible cables 40, 57 due to the formation of holes can be avoided.

The first flexible cable 40 includes the first connecting end portions 41 to be connected to the first terminal fittings 39 mounted in the first housing 27. The second flexible cable 57 includes the second connecting end portion 58 to be connected to the second terminal fittings 56 mounted in the second housing 46. The second boss pins 54 are passed through the first connecting end portions 41, and the first boss pins 37 are passed through the second connecting end portion 58. In the width direction orthogonal to a stacking direction of the first and second housings 27, 46, the first connecting end portions 41 and the second connecting end portion 58 are at least partially arranged in mutually different regions. According to this configuration, margins can be provided for the intervals of the first and second boss pins 37, 54 in the width direction.

The flexible cable connector is provided with the outer housing 10 for accommodating the first and second housings 27, 46 in the stacked state. The lock arm 12 is formed in the central part in the width direction of the outer housing 10. The first housing 27 is formed with the cut portion 33 for avoiding interference with the lock arm 12. The pair of first connecting end portions 41 are arranged across the lock arm 12 in the width direction. According to this configuration, load concentration on some first boss pins 37 can be prevented when a tensile force acts on the first flexible cable 40.

The second window holes 20 for exposing the first boss pins 37 and the first window holes 15 for exposing the second boss pins 54 are formed in the outer surface of the outer housing 10. If the inner module 25 is properly inserted in the outer housing 10, the first boss pins 37 can be seen in the second window holes 20 and the second boss pins 54 can be seen in the first window holes 15. That is, a positional relationship of the first and second housings 27, 46 with respect to the outer housing 10 can be visually confirmed.

The outer housing 10 is formed with the first holding portions 13 and the second holding portion 18 swingable in the stacking direction of the first and second housings 27, 46. The first and second holding portions 13, 18 can sandwich and hold the first and second flexible cables 40, 57 in the stacking direction by being held at the closing position. The first and second holding portions 13, 18 are formed with the first and second window holes 15, 20. With the first and second flexible cables 40, 57 sandwiched by the first and second holding portions 13, 18, the second boss pins 54 are fit in the first window holes 15 and the first boss pins 37 are fit in the second window holes 20.

According to this configuration, if the first and second housings 27, 46 are assembled with the outer housing 10 in an improper state such as a vertically inverted state, the first holding portions 13 interfere with the second boss pins 54 while swinging to the closing position and the second holding portion 18 interferes with the first boss pins 37 while swinging to the closing position. Based on the presence or absence of such interference, it can be judged whether or not the first and second housings 27, 46 are accommodated in a proper state into the outer housing 10.

The first housing 27 includes the first front locking portions 32 and the first rear locking portions 36 as locking portions for holding the first and second housings 27, 46 in the stacked state. The second housing 46 includes the second front locking portions 51 and the second rear locking portions 53 as locking portions for holding the second and second housings 27, 46 in the stacked state. According to this configuration, the first and second housings 27, 46 can be integrated before being assembled with the outer housing 10 by the locking action of the first and second front locking portions 32, 51 and the locking action of the first and second rear locking portions 36, 53. In this way, workability is improved in mounting the inner module 25 into the outer housing 10.

Other Embodiments

The present invention is not limited to the above described and illustrated embodiment, but is represented by claims. The present invention is intended to include all changes in the scope of claims and in the meaning and scope of equivalents and also include the following embodiments.

Although the first flexible cable is arranged on the surface of the first housing on the side opposite to the first boss pins in the above embodiment, the first flexible cable may be arranged on the same surface as the first boss pins.

Although the second flexible cable is arranged on the surface of the second housing on the side opposite to the second boss pins in the above embodiment, the second flexible cable may be arranged on the same surface as the second boss pins.

Although only parts of the first connecting end portions and only a part of the second connecting end portion are arranged in mutually different regions in the width direction in the above embodiment, the entire first connecting end portions and the entire second connecting end portion may be arranged in mutually different regions in the width direction or the entire first connecting end portion and the entire second connecting end portion may be arranged at the same position in the width direction.

Although the first flexible cable is formed with the pair of first connecting end portions in the above embodiment, only one first connecting end portion may be provided.

Although the first connecting end portions are arranged across the lock arm in the above embodiment, the first connecting end portions may be arranged to at least partially overlap the lock arm.

Although the outer housing is formed with the window holes in the above embodiment, the outer housing may include no window hole.

Although the first and second boss pins are fit in the window holes with the first and second housings sandwiched by the holding portions in the above embodiment, the first and second boss pins may not be fit in the window holes with the first and second housings sandwiched by the holding portions.

Although only two modules including the first and second modules are stacked in the above embodiment, three or more modules may be stacked.

LIST OF REFERENCE NUMERALS

10 . . . outer housing
11 . . . housing body portion
12 . . . lock arm
13 . . . first holding portion (holding portion)
14 . . . first hinge portion
15 . . . first window hole (window hole)
16 . . . first holding hole
17 . . . holding projection
18 . . . second holding portion (holding portion)
19 . . . second hinge portion
20 . . . second window hole (window hole)
21 . . . second holding hole
25 . . . inner module
26 . . . first module
27 . . . first housing
28 . . . first terminal accommodating portion
29 . . . first terminal accommodation chamber
30 . . . first base plate portion
31 . . . first linking portion
32 . . . first front locking portion (locking portion)
33 . . . cut portion
34 . . . first holding projection
35 . . . holding hole portion
36 . . . first rear locking portion (locking portion)
37 . . . first boss pin
38 . . . first fitting hole
39 . . . first terminal fitting
40 . . . first flexible cable
41 . . . first connecting end portion
42 . . . first through hole
45 . . . second module
46 . . . second housing
47 . . . second terminal accommodating portion
48 . . . second base plate portion
49 . . . second linking portion
50 . . . second terminal accommodation chamber
51 . . . second front locking portion (locking portion)
52 . . . second holding projection
53 . . . second rear locking portion (locking portion)
54 second boss pin
55 . . . second fitting hole
56 . . . second terminal fitting
57 . . . second flexible cable
58 . . . second connecting end portion
59 . . . second through hole

What is claimed is:

1. A flexible cable connector, comprising:
a first housing;
a second housing to be stacked on the first housing;
a first flexible cable to be connected to a first terminal fitting mounted in the first housing;
a second flexible cable to be connected to a second terminal fitting mounted in the second housing;
first boss pins formed on the first housing, the first boss pins positioning the second housing and the second flexible cable by being passed through the second housing and the second flexible cable;
second boss pins formed on the second housing, the second boss pins positioning the first housing and the first flexible cable by being passed through the first housing and the first flexible cable; and
an outer housing covering the first housing and the second housing.

2. The flexible cable connector of claim 1, wherein:
the first flexible cable is arranged along a surface of the first housing on a side opposite to the first boss pins, and
the second flexible cable is arranged along a surface of the second housing on a side opposite to the second boss pins.

3. The flexible cable connector of claim 1, wherein:
the first flexible cable includes a first connecting end portion to be connected to the first terminal fitting,
the second flexible cable includes a second connecting end portion to be connected to the second terminal fitting,
the second boss pins are passed through the first connecting end portion,
the first boss pins are passed through the second connecting end portion, and
at least a part of the first connecting end portion and at least a part of the second connecting end portion are arranged in mutually different regions in a width direction orthogonal to a stacking direction of the first and second housings.

4. A flexible cable connector, comprising:
a first housing;
a second housing to be stacked on the first housing;
a first flexible cable to be connected to a first terminal fitting mounted in the first housing;
a second flexible cable to be connected to a second terminal fitting mounted in the second housing;
first boss pins formed on the first housing, the first boss pins positioning the second housing and the second flexible cable by being passed through the second housing and the second flexible cable;
second boss pins formed on the second housing, the second boss pins positioning the first housing and the first flexible cable by being passed through the first housing and the first flexible cable,
wherein:
the first flexible cable includes a first connecting end portion to be connected to the first terminal fitting,
the second flexible cable includes a second connecting end portion to be connected to the second terminal fitting,
the second boss pins are passed through the first connecting end portion,
the first boss pins are passed through the second connecting end portion, and
at least a part of the first connecting end portion and at least a part of the second connecting end portion are arranged in mutually different regions in a width direction orthogonal to a stacking direction of the first and second housings, and the flexible cable connector further comprises an outer housing for accommodating the first and second housings in a stacked state, wherein:

a lock arm is formed in a central part in the width direction of the outer housing, the first housing is formed with a cut portion for avoiding interference with the lock arm, and a pair of the first connecting end portions are arranged across the lock arm in the width direction.

5. A flexible cable connector, comprising:

a first housing;

a second housing to be stacked on the first housing;

a first flexible cable to be connected to a first terminal fitting mounted in the first housing;

a second flexible cable to be connected to a second terminal fitting mounted in the second housing;

first boss pins formed on the first housing, the first boss pins positioning the second housing and the second flexible cable by being passed through the second housing and the second flexible cable; and second boss pins formed on the second housing, the second boss pins positioning the first housing and the first flexible cable by being passed through the first housing and the first flexible cable, wherein the flexible cable connector further comprises an outer housing for accommodating the first and second housings in a stacked state, and wherein window holes for exposing the first and second boss pins are formed in an outer surface of the outer housing.

6. The flexible cable connector of claim 5, wherein:

the outer housing is formed with a holding portion swingable in a stacking direction of the first and second housings, the holding portion holding the first and second flexible cables in a sandwiched state, the holding portion is formed with the window holes, and the first and second boss pins are fit in the window holes with the first and second flexible cables sandwiched by the holding portion.

7. The flexible cable connector of claim 5, wherein the first and second housings include locking portions for holding the first and second housings in the stacked state.

* * * * *